(12) United States Patent
Deese

(10) Patent No.: US 7,395,755 B1
(45) Date of Patent: Jul. 8, 2008

(54) CONTAINER CRUSHER AND METHOD OF USE THEREOF

(76) Inventor: Henry W. Deese, P.O. Box 291, Polkton, NC (US) 28135

( * ) Notice: Subject to any disclaimer, the term of this patent is extended or adjusted under 35 U.S.C. 154(b) by 0 days.

(21) Appl. No.: 11/706,024

(22) Filed: Feb. 13, 2007

Related U.S. Application Data (60) Provisional application No. 60/772,833, filed on Feb. 13, 2006.

(51) Int. Cl.
*B30B 9/00* (2006.01)
*B30B 13/00* (2006.01)

(52) U.S. Cl. ............... 100/35; 100/90; 100/902; 141/7; 141/65; 53/434; 53/512

(58) Field of Classification Search ........... 100/90, 100/269.01, 270, 902, 35, 299; 99/472, 476, 99/646 C; 141/65, 7, 8, 12, 98; 53/510, 53/434, 512
See application file for complete search history.

(56) References Cited

U.S. PATENT DOCUMENTS

| | | | |
|---|---|---|---|
| 2,357,879 A * | 9/1944 | De Berg, Jr. ............. | 156/382 |
| 4,521,172 A * | 6/1985 | Gilbert .................... | 425/73 |
| 4,748,905 A * | 6/1988 | Langdon ................. | 100/90 |
| 5,265,530 A | 11/1993 | Perhacs et al. | |
| 5,448,946 A | 9/1995 | Laux | |
| 5,802,968 A | 9/1998 | Kirschner et al. | |
| 5,937,747 A | 8/1999 | Kahil | |
| 6,446,683 B1 | 9/2002 | Mitchell et al. | |
| 6,598,522 B2 | 7/2003 | Yamaguchi | |
| 6,609,456 B1 | 8/2003 | Schneider | |
| 6,679,677 B2 | 1/2004 | Yamauchi | |
| 6,799,506 B2 * | 10/2004 | Tarlow .................... | 99/472 |
| 2003/0136279 A1* | 7/2003 | Tarlow .................... | 100/90 |
| 2005/0039421 A1* | 2/2005 | Cheung ................... | 53/510 |

\* cited by examiner

*Primary Examiner*—Jimmy T Nguyen
(74) *Attorney, Agent, or Firm*—Robert C. Montgomery (57) ABSTRACT

An aesthetic and useful device for enclosing a vacuum pump within a framed enclosure for the evacuation of air from used containers is herein disclosed. An enclosure for a vacuum pump comprises a latching access door, a lid, and a container-staging area that extends downward, effectively housing a vacuum pump supported by an interior shelf. A vacuum chamber for collecting any entrained liquids or solids from used containers is coupled at one end to vacuum plumbing extending from the inlet of the vacuum pump and at the other end to a container adapter. The container adapter has a stepped female diameter opening to accommodate various sized container mouths. A sealed and latched access door maintains the integrity of the vacuum chamber as well as provides an aesthetic and protective shroud for the vacuum pump.

18 Claims, 4 Drawing Sheets

CONTAINER CRUSHER AND METHOD OF USE THEREOF

RELATED APPLICATIONS

The present invention was first described in U.S. Provisional Patent Application No. 60/772,833 filed on Feb. 13, 2006.

FIELD OF THE INVENTION

The present invention relates generally to a useful and unique apparatus for enclosing a vacuum pump for the evacuation of air from a used plastic container and, more particularly, to an enclosure for a vacuum pump comprising a latching access door, a lid, a container staging area extending downward that effectively houses a vacuum pump supported by an interior shelf, and a vacuum chamber for collecting any entrained liquids or solids from used containers.

BACKGROUND OF THE INVENTION

With society's increasing awareness of the world's dwindling supply of natural resources and overflowing landfills, many communities are providing, and even mandating, recycling services to its residents. The benefits of these efforts have already begun to be seen and will continue to be realized into the future. However, as with most beneficial programs, these efforts are accompanied by some burdens. One of these burdens is that in order to separate the various recyclable materials such as, but not limited to: glass, plastic, paper, aluminum, and cardboard, more space and receptacles are required. As a result, most people resort to purchasing a multitude of trash cans or other containers and, prior to placing the recyclables inside, thoroughly crush and compress them in order to maximize container space. While this is an effective practice when dealing with conventional refuse, it is of little use with plastic bottles, cans, and other containers because it is difficult to crush them completely and also because of the resilient nature of the plastic or metal material, which leads to subsequent expansion towards its original shape.

Addressing the need as identified immediately above, this novel, innovative apparatus is intended to reduce space required by discarded containers in the recycling process. The apparatus consists of a vacuum pump that is equipped with a nozzle and a variety of adapters that adapt to the variety of openings commonly encountered on typical recyclable plastic bottles, cans, and other containers. With the container opening placed on the nozzle, the user simply flips a switch and the vacuum pump begins removing the air from within the container, completely crushing it. As a result, the container remains compressed and is less likely to expand toward its original shape. The equipment is located in a durable metal housing that is capable of surface or wall mounting. The use of this apparatus and system allows one to reduce the physical space required by used containers in a manner, which is quick, easy, and efficient.

Several attempts have been made in the past to crush plastic containers for subsequent refuse or recycling activities. U.S. Pat. No. 6,609,456, in the name of Schneider, discloses a hand-held household container compressing device, comprising a long straight handle with a container-receiving aperture and a non-slip base. Unfortunately, the Schneider device does not utilize a vacuum pump to eliminate the stress of manually compressing a container and to effectively evacuate the maximum amount of air as possible.

U.S. Pat. No. 5,937,747, issued in the name of Kahil, teaches a container crusher having a central aperture surrounding a concave area for resting on the neck area of said container and hand grips. A downward motion from the user on the hand grips crushes the container until it is compressed. Unfortunately, the Kahil device also suffers from the same setbacks as the Schneider device and, as such, does not fall under the scope of the present invention.

U.S. Pat. No. 5,802,968, issued in the name of Kirschner et al., describes a container crushing apparatus employing a stationary presser member, a confronting movable presser member, links that enable the movable presser member with respect to the stationary presser member, and a lever for effecting the movement. As the movable presser unit is forced toward the stationary presser member with a container placed therebetween, the said container is crushed. The Kirschner et al. device utilizes a mechanical device to crush the containers in question whereas the present invention utilizes a vacuum pump to effectively evacuate the air within the containers.

U.S. Pat. No. 5,448,946, issued in the name of Laux, discloses an apparatus for compressing a container, comprising a housing with a lid (the lid containing a hole to receive the top of a container) a shelf for resting the container thereon, a set of rods where the shelf travels on, and a set of gears, belts, and handles to force the shelf to travel on the rods and press against the lid, thereby crushing the container held therein. This device also utilizes a mechanical pressing apparatus and system to effect a crushed container and does not utilize a vacuum pumping apparatus to evacuate the chamber of the container to be crushed.

U.S. Pat. No. 5,265,530, issued in the name of Perhacs et al., teaches a device for compacting hollow aluminum or plastic containers, comprising a base having a concave surface, an arm with a convex surface, and a hinge for securing the arm to the base. The base is preferably mounted to a vertical wall and the arm has a plate. When the arm is forced towards the base with a container placed therebetween, the container is crushed. The Perhacs et al. device, along with the aforementioned devices, teaches a mechanical device to crush the containers in question.

U.S. Pat. No. 6,598,522, issued in the name of Yamaguchi, describes an empty container pressing machine, comprising a pedestal with a container bearing portion, a pair of guide posts outside the container bearing portion, a container presser vertically movable about the guide posts, and a buckling mechanism. The Yamaguchi design allows the operator to stand on the container-bearing portion while manipulating the presser along the guide posts, and, as such, differs from the vacuum pump assembly of the present invention.

U.S. Pat. No. 6,679,677, issued in the name of Yamauchi, discloses a vacuum pump having a casing, an inlet port, an outlet port, a flange integral with the casing, and an exhaust means for drawing the gas within the inlet port and discharging it through the outlet port.

U.S. Pat. No. 6,446,683, issued in the name of Mitchell et al., describes an attachment for a vacuum gun specifically for evacuating a fluid from a reservoir of fluid, such as brake fluid from a brake system.

None of the prior art particularly describes an apparatus that effectively crushes plastic bottles and containers to a minimal volume with a vacuum pump and chamber. Accordingly, the need has arisen for a solution to this problem that provides a means by which recyclable plastic bottles, aluminum cans, and the like can be effectively compressed in order to maximize storage space.

SUMMARY OF THE INVENTION

In view of the foregoing disadvantages inherent in the prior art, it has been observed that there is need of an automatic container crusher utilizing a vacuum pump to provide an evacuating process for evacuating said container.

It has further been observed that there is a need for a device that is fully automated, easy to use, and mountable on a vertical wall for space-saving properties.

The object of the present invention is to provide such a device for the crushing of containers, comprising a framed enclosure, a vacuum chamber, a vacuum pump mounted within said framed enclosure, a solenoid vent valve, vacuum plumbing, a container adapter, an electrical box, a power cord, and an on/off switch.

A further object of the present invention provides for said framed enclosure further comprising a first side panel, a second side panel, a top panel connected to the top ends of both side panels, a bottom panel connected to an intermediary location of both side panels, a rear panel downwardly extending from said top panel and connected to both said side panels and having a plurality of mounting holes, a pump mounting panel affixed thereto both side panels in an intermediary location between said top and bottom panels and providing a horizontal shelf wherein said vacuum pump is mounted thereto, and a door hingedly connected to said first side panel, wherein said framed enclosure provides a housing for various containers and evacuation equipment in an aesthetic and sound-reducing manner.

Another object of the present invention provides for said first and second side panels having a first louver and a second louver, each located on an upper half of said first and second side panel and comprises a plurality of aluminum slide-in-type louvered panels, thereby providing a cooling and ventilation means to remove heat generated when said vacuum pump is active.

Yet another object of the present invention provides for said door panel further comprising a doorknob located on an exterior wall and a chamber support feature attached to an interior wall, which provides a male feature which is inserted into a front opening of said vacuum chamber upon closing the door, thereby providing structural support to said vacuum chamber as vacuum forces are applied during said evacuation process.

Another object of the present invention provides for said door panel having a door louver located on an upper half of said door panel and comprises a plurality of aluminum slide-in-type louvered panels, thereby providing a cooling and ventilation means to remove heat generated when said vacuum pump is active.

Still yet another object of the present invention provides a door securing mechanism, comprising a door latch located on said interior wall of said door panel and a door catch located on a front wall of said pump mounting panel, whereby said door securing mechanism is preferably a double roller catch device but may also be provided in a variety of device styles such as a magnetic catch.

A further object of the present invention provides for said framed enclosure wherein each said first side panel, second side panel, top panel, bottom panel, rear panel, door panel, and pump mounting panel have a width in the range of one-quarter (¼") to three-quarters (¾") inches thick and fabricated out of one or more materials from the following list: wood, plastic, fiberglass, aluminum, or composite material.

Another object of the present invention provides for said framed enclosure to be provided in a variety of decorative colors and patterns being suitable for either industrial or home applications.

Another object of the present invention provides for said vacuum chamber, comprising a rigid cubic structure with an open end capable of withstanding the forces of an internal high vacuum and fabricated out of one or more of the following materials: fiberglass or aluminum, thereby providing a temporary collection and containment means for any entrained liquids or solids emitting from said containers during said evacuation process.

Still another object of the present invention provides for said vacuum chamber further comprising a first chamber adapter fabricated out of corrosion-resistant materials and comprising: a first plumbing fitting means between said vacuum plumbing and an upper orifice of said vacuum chamber and a first sealing means; a second chamber adapter fabricated out of corrosion-resistant materials and comprising: a second plumbing fitting means between a lower orifice of said vacuum chamber and said container adapter and a second sealing means; a lip, wherein said lip provides a liquid containment means for said vacuum chamber and located along a front lower edge of said vacuum chamber with a height of a range of one-half (½") to one inch (1"); and, a gasket on an outer periphery of said open end for engaging said chamber support feature of said door panel for providing a vacuum sealing means between said vacuum chamber and said door panel.

Still another object of the present invention provides for said gasket, comprising one of the following list: a thin silicone rubber gasket applied as an adhesive layer, or an extruded plastic gasket mechanically supported by said open end of said vacuum chamber.

Yet another object of the present invention provides for said first and second sealing means further comprising sealing washers and a nut that is fabricated out of one of the following list: nylon or polytetrafluoroethylene, thereby providing an airtight seal for said vacuum chamber to said vacuum plumbing and said container adapter.

Yet another object of the present invention provides for said vacuum pump, comprising a commercially available diaphragm-type pump common in the industry, further comprising: a rated flow capacity within a range of three (3) and six (6) cubic feet per minute; a peak vacuum level of at least twenty-six (26) inches of mercury (1.27 PSI); and, a cartridge filter which provides a protection means to said vacuum pump against entrained airborne particles.

Still yet another object of the present invention provides for said vacuum plumbing further comprising a solenoid vent valve, providing a backfilling means to said vacuum plumbing and said vacuum chamber at a conclusion of said evacuation process and comprising one of the following: a commercially available 110-volt AC solenoid pressure relief valve, or a needle valve; vacuum tubing, fittings, and mounting devices.

Yet still another object of the present invention provides for an electrical box, mounted on an interior wall of said first side panel, for receiving current from a power cord and supplying power to said vent valve and said vacuum pump, said power is controlled by an on/off switch, mounted on an exterior wall of said first side panel, which provides a control means to initiate said evacuation process.

Yet still another object of the present invention provides for said evacuation process to take between one (1) and two (2) minutes depending on an internal volume of said container being evacuated.

Another object of the present invention provides for said container adapter, comprising a removably attachable device removably mounted thereto said second chamber adapter at an upper extremity and provides an attachment means to a variety of plastic containers at a lower extremity. Said lower extremity comprises a stepped female design with graduated diameters to provide a radially supported seal to a plurality of container mouths having different diameters.

Another object of the present invention provides for said container adapter comprising a pliable and sealable material of the following list: silicone rubber or urethane rubber, and provided in a plurality of different sizes for different container mouth diameters.

Another object of the present invention provides a system of a plurality of air fresheners incorporated thereinto said first, second, and door louvers, thereby reducing an emission of foul odors from said evacuation process due to entrained liquids or solids from said containers.

Another object of the present invention provides an internal timer in electrical communication with said on/off switch, thereby allowing said vacuum pump to stop and discontinue said evacuation process and said container to drop into a receptacle for further processing.

A method for crushing a container utilizing a vacuum pump provided therein a framed enclosure comprises the steps of: selecting a preferred vertical wall surface on which to mount said apparatus, said apparatus having been received in a pre-assembled state wherein said vacuum pump, said vacuum chamber, electrical wiring, and said vacuum plumbing components are installed therein said framed enclosure; removing said vacuum chamber temporarily by disassembling said first chamber adapter and said second chamber adapter; mounting said apparatus to said vertical wall surface using said mounting holes and provided fasteners; re-installing said vacuum chamber; connecting said power cord to an available 110 volt AC outlet; closing said door panel and verifying that said door latch is connected securely to said door catch, thereby sealing said gasket thereto said door panel and eliminating any possible vacuum leaks; placing a mouth of said container to be evacuated upward and centered within said container adapter, thereby forming a snug seal; moving said on/off switch to an "ON" position, thereby providing electrical current to said electrical box and thereto said vacuum pump and vent valve and beginning said evacuation process; reducing a volume of said container and enabling said container to completely collapse; moving said on/off switch to an "OFF" position, thereby discontinuing operation of said vacuum pump; activating said vent valve, thereby returning said vacuum plumbing and vacuum chamber to atmospheric pressure; removing and disposing of said container; opening said door panel and cleaning any residual liquid or entrained solids contained within said vacuum chamber; and, contributing to an environmental maintenance program by reducing a space required to dispose of said containers.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 plastic container crusher
19 first side panel
20 enclosure
21 second side panel
22 top panel
23 bottom panel
24 mounting panel
25 door
26 knob
27 hinge
28 rear panel
29 mounting hole
30 door louver
31 side louver
32 door latch
33 door catch
34 chamber support
35 fan
40 vacuum pump
41 filter
42 vent valve
43 washer
44 nut
45 first chamber adapter
46 container adapter
47 vacuum plumbing
48 second chamber adapter
50 electric box
51 power cord
52 on/off switch
60 vacuum chamber
61 lip
62 gasket
63 evacuated air
80 plastic container
81 entrained liquid

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for a plastic container crusher (herein described as the "apparatus") 10, which provides an enclosure 20 means for a vacuum pump 40 mounted therein to enable the evacuation of used plastic containers 80 to reduce the space required for disposal. The enclosure 20 also houses a vacuum chamber 60 to collect and contain any entrained liquids 81 or solids from said containers 80 during the evacuation process. The enclosure 20 comprises a wooden or metallic box-like structure capable of supporting the evacuation equipment 40 while maintaining a pleasing and aesthetic appearance.

Figure 1:
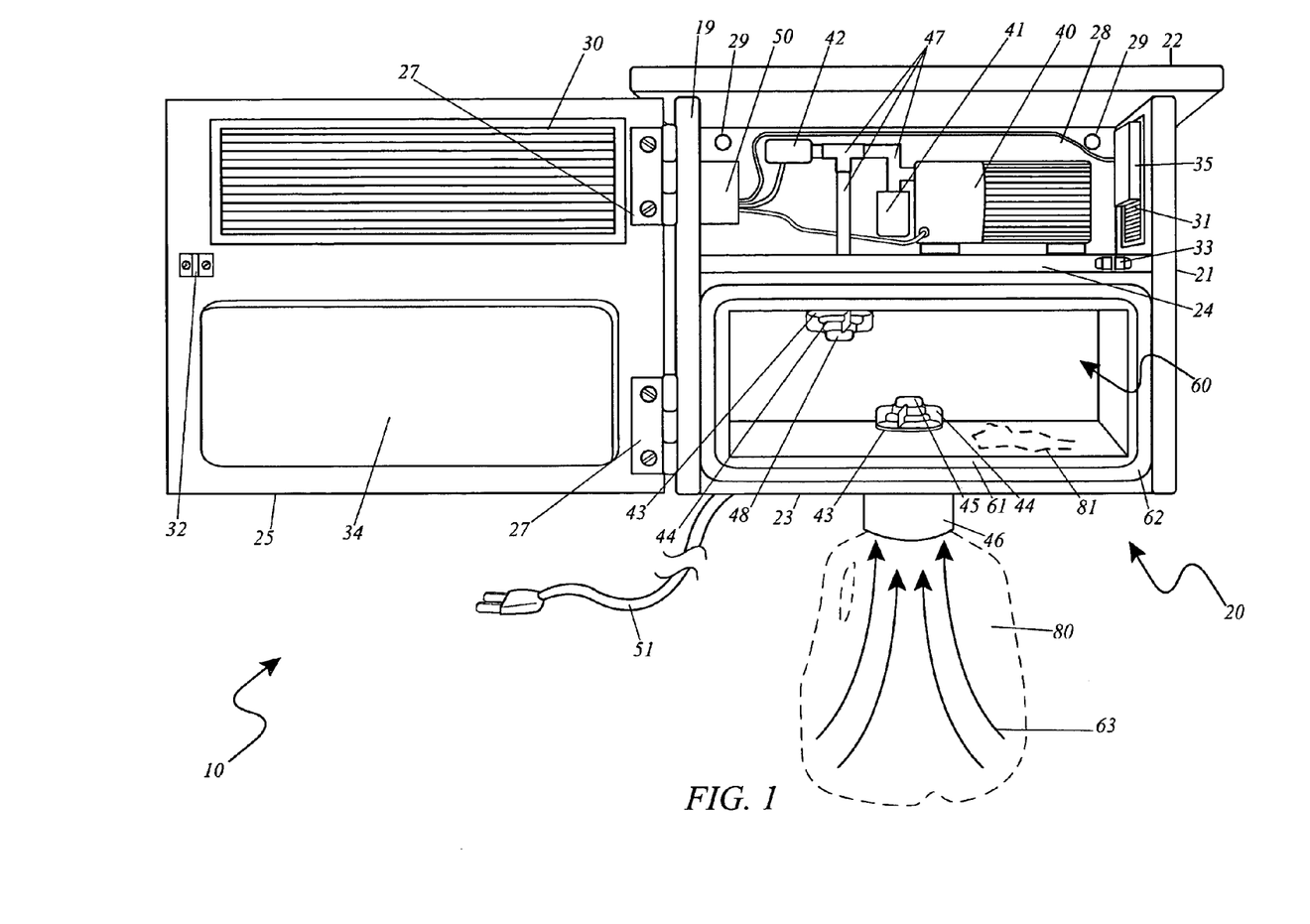
FIG. 1 is a front view of the plastic container crusher 10, according to a preferred embodiment of the present invention; and, FIG. 2 is a side perspective view of the plastic container crusher 10, according to a preferred embodiment of the present invention; and, FIG. 3 is a rear perspective view of the plastic container crusher 10, according to a preferred embodiment of the present invention; and, FIG. 4a is an upward looking view of the vacuum chamber 60 portion of the plastic container crusher 10, according to a preferred embodiment of the present invention; and, FIG. 4b is a section view of the container adapter 46 portion of the plastic container crusher 10, according to a preferred embodiment of the present invention; and, FIG. 5 is a schematic block diagram of the plastic container crusher 10, according to a preferred embodiment of the present invention.

Referring now to FIG. 1, a front view of the apparatus 10, according to the preferred embodiment of the present invention, is disclosed. The apparatus 10 comprises a framed enclosure 20, a vacuum chamber 60, a vacuum pump 40, a pump filter 41, a solenoid vent valve 42, vacuum plumbing 47, a plurality of washers 43, a plurality of nuts 44, a first chamber adapter 48, a container adapter 46, a second chamber adapter 45, an electrical box 50, a power cord 51, and an on/off switch 52.

The framed enclosure 20 provides a housing means for the evacuation equipment in an aesthetic and sound-reducing manner. The framed enclosure 20 further comprises a first side panel 19, a second side panel 21, a top panel 22, a bottom panel 23, a pump mounting panel 24, a door 25, a door knob 26, two (2) hinges 27, a rear panel 28, a plurality of mounting holes 29, a door louver 30, two (2) side louvers 31, a door latch 32, a door catch 33, and a chamber support feature 34. The various panels 19, 21, 22, 23, 24, that make up the framed enclosure 20 are envisioned to be fabricated from panels approximately one-quarter (¼") to three-quarters (¾") inches thick using materials such as, but not limited to; wood, plastic, fiberglass, aluminum, or the like. The panels 19, 21, 22, 23, 24, provide an attachment means thereto all electrical and plumbing equipment provided by the present invention 10 contained therein. The door 25 assembly comprises cabinet type hardware such as hinges 27 for affixing said door 25 to said first side panel 19, and a doorknob 26 which are common in the art. The door latch 32, and door catch 33 are shown in a preferred embodiment being a double roller catch device but may be provided in a variety of device styles such as a magnetic catch or the like. The door panel 25 comprises an injection molded or cast panel made of materials such as fiberglass, plastic, or the like materials which contain minimum warpage. The door panel 25 further comprises a chamber support feature 34, which provides a male feature that is inserted into the front opening of the vacuum chamber 60 upon closing the door 25, thereby providing structural support to said chamber opening 60 as vacuum forces are applied during the evacuation process. The said panels 19, 21, 22, 23, 24, 25, are envisioned to be provided in a variety of decorative colors and patterns being suitable for either industrial or home applications of the apparatus 10. The door louver 30 located on an upper half of said door 25, and the two (2) side louvers 31 each located on an upper half of said first side panel 19 and said second side panel 21, comprise aluminum slide-in type louvered panels and provide a cooling and ventilation means to remove the heat generated when the vacuum pump 40 is active. The fan 35 is attached to the inside surface of the second side panel 21 adjacent to the side louver 31 thereby providing additional cooling of the vacuum pump 40 during operation. The mounting panel 24 comprises an interior horizontal shelf located above the vacuum chamber 60, thereby providing a support means and an attachment means for the vacuum pump 40.

The vacuum chamber 60 provides a temporary collection and containment means for any entrained liquids 81 or solids emitting from the plastic containers 80 during the evacuation process. The vacuum chamber 60 comprises a rigid structure capable of withstanding the forces of an internal high vacuum. The vacuum chamber 60 is envisioned to be made of materials such as fiberglass, aluminum, or the like and provides two (2) vacuum penetrations for connection of the vacuum system, which will be discussed below. The vacuum chamber 60 further comprises a lip 61 and a gasket 62. The lip 61 provides a liquid 81 containment means to the vacuum chamber 60 as residual liquids 81 from the plastic containers 80 are collected in the vacuum chamber 60. The lip 61 is located along the front lower edge of said chamber 60 and is envisioned to be approximately one-half (½") to one inch (1") in height. The vacuum chamber 60 is envisioned to be periodically cleaned to remove said liquids 81. The gasket 62 provides a vacuum sealing means between the vacuum chamber 60 and the door panel 25. The gasket 62 is envisioned to be provided as an "O"-ring seal; however, the gasket 62 may be alternately provided as a thin silicone rubber gasket applied as an adhesive layer or as an extruded gasket being mechanically supported by the edges of the vacuum chamber opening 60.

The vacuum system provides a gas evacuation and crushing means thereto being applied to various plastic containers 80. The vacuum system comprises a pump 40, a pump filter 41, a solenoid vent valve 42, a first chamber adapter 48, a second chamber adapter 45, a container adapter 46, and vacuum plumbing 47. The vacuum pump 40 comprises a commercially available diaphragm-type pump common in the industry. The vacuum pump 40 further comprises a rated flow capacity of between three (3) and six (6) cubic feet per minute and a peak vacuum level of at least twenty-six (26) inches of mercury (1.27 PSI). The vacuum pump 40 further comprises a cartridge filter 41, which provides a protection means to the pump 40 against airborne particles. The solenoid vent valve 42 provides a backfilling means to the vacuum plumbing 47, and the vacuum chamber 60 at the conclusion of the evacuation process. The vent valve 42 comprises a commercially available 10-volt AC solenoid pressure relief valve, needle valve, or the like, common in the industry. The vacuum plumbing 47 provides a plumbing means between the major components of the system and is envisioned to be made using one-quarter (¼") or three-eighths (⅜") inch diameter stainless steel plumbing fittings 47. The first chamber adapter 48 comprises a plumbing fitting means between the vacuum plumbing 47 and the interior of the vacuum chamber 60. The first chamber adapter 48 further comprises a penetrating and sealing means through the roof of the vacuum chamber 60 using sealing washers 43 and a nut 44, thereby providing an airtight seal. The sealing washers 43, and the nut 44 are envisioned to be commercially available products made of nylon, Teflon® (PTFE), or the like and are common in the industry. The first chamber adapter 48 is envisioned to be made of corrosion resistant materials such as stainless steel, plastic, or the like. The second chamber adapter 45 comprises a similar bulkhead construction and materials as the first chamber adapter 48; however, the second chamber adapter 45 comprises a plumbing fitting means between the interior of the vacuum chamber 60 and the plastic container adapter 46. The second chamber adapter 45 further comprises a penetrating and sealing means through the floor of the vacuum chamber 60 using the aforementioned sealing washers 43 and nut 44, thereby providing an air-tight seal. The container adapter 46 comprises a removably attachable device mounted to the second chamber adapter 45 at the upper extremity and provides an attachment means to a variety of plastic containers 80 at the lower extremity (see FIG. 4b description).

Figure 2:
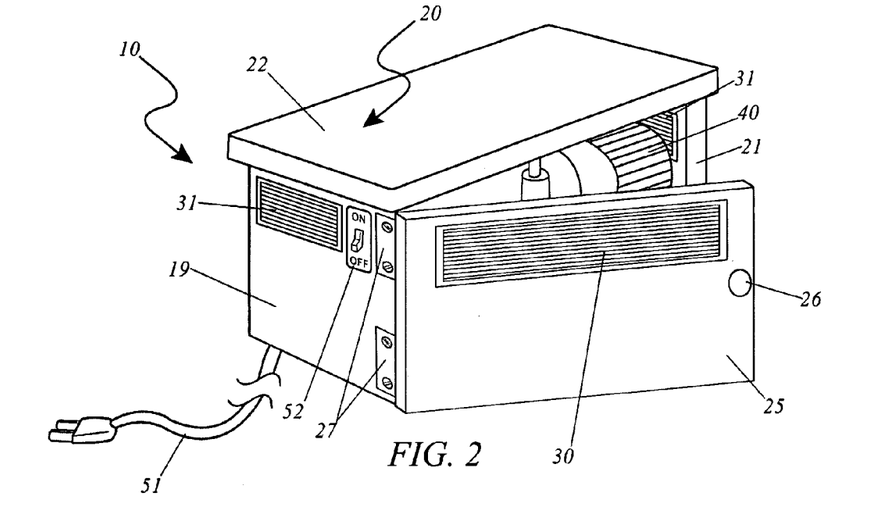

Referring now to FIG. 2, a side perspective view of the apparatus 10, according to the preferred embodiment of the present invention, is disclosed. The apparatus 10 comprises a framed enclosure 20, a door louver 30, a pair of side louvers 31, a power cord 51, an on/off switch 52, and a vacuum pump 40. The power cord 51 provides continuous 110 volt AC current to the apparatus 10. The on/off switch 52, located on the first side panel 19, provides a control means to initiate the evacuation process by supplying current to the vacuum pump 40. The evacuation process is envisioned to take approximately one (1) to two (2) minutes depending on the internal volume of the particular plastic container 80 being evacuated.

Figure 3:
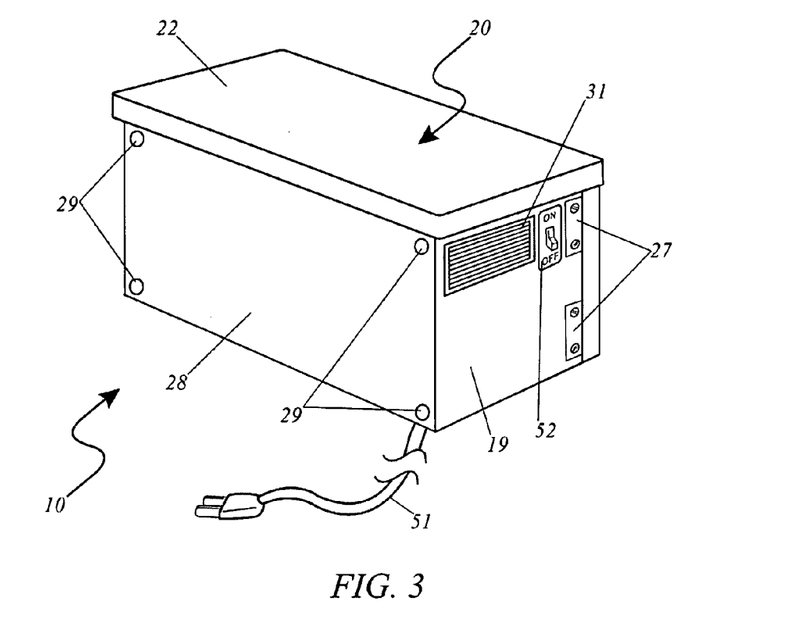

Referring now to FIG. 3, a rear perspective view of the apparatus 10, according to the preferred embodiment of the present invention, is disclosed. A plurality of mounting holes 29 is formed on the rear panel 28 of the framed enclosure 20 and provides an attachment means to a stud wall or other desired mounting surface.

Figures 4A, 4B:
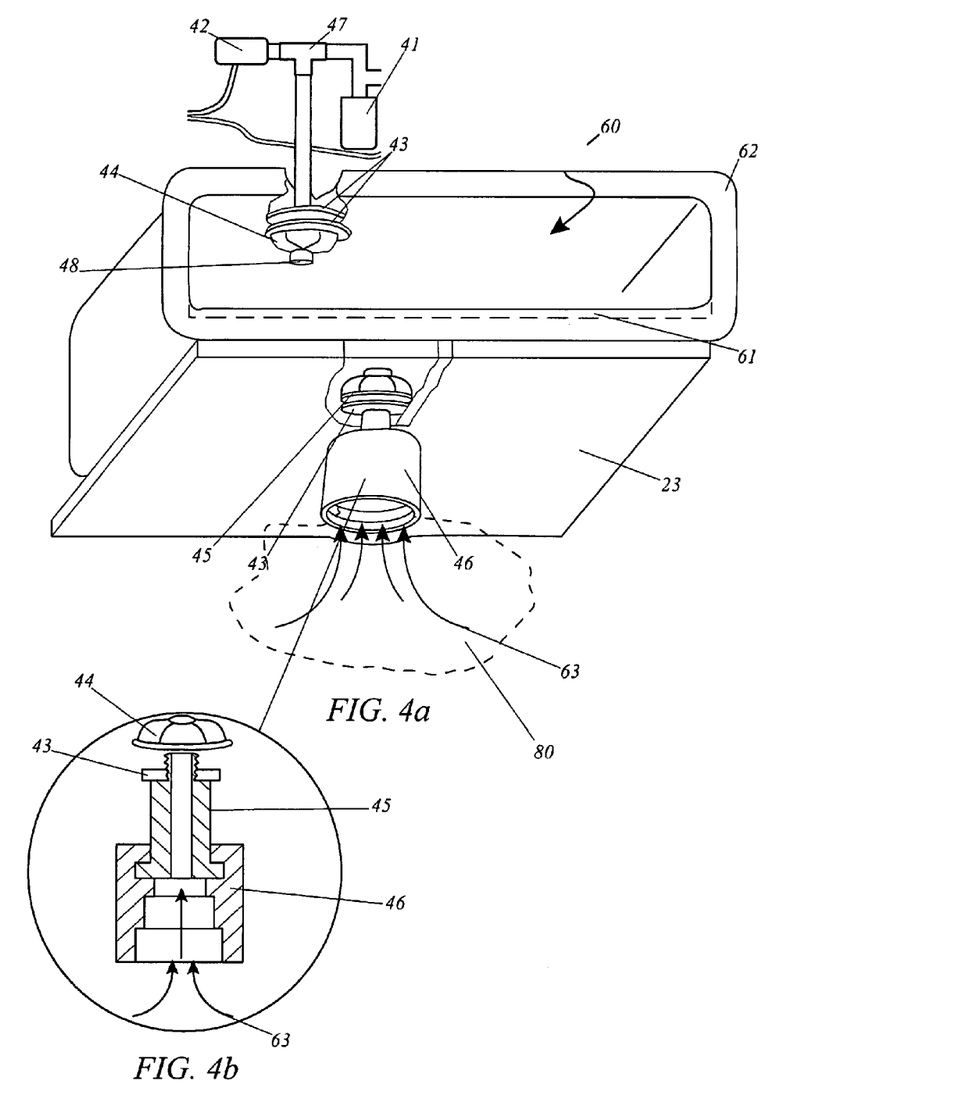

Referring now to FIG. 4a, an upward looking view of the vacuum chamber 60 portion of the apparatus 10, according to the preferred embodiment of the present invention, is disclosed. Illustrated here is an isolated view of the bottom of the vacuum chamber 60 depicting the relative position of the associated components to said vacuum chamber 60. The apparatus 10 as shown here comprises a bottom panel 23, a vacuum chamber 60, a first chamber adapter 48, a second chamber adapter 45, a container adapter 46, vacuum plumbing 47, a vent valve 42, and a filter 41. The first and second chamber adapters 48, 45, provide a sealed penetration means to interconnect the vacuum system to the vacuum chamber 60. The second chamber adapter 45 provides an attachment means to the container adapter 46 (see FIG. 4b description).

Referring now to FIG. 4b, a section view of the container adapter 46 portion of the apparatus 10, according to the preferred embodiment of the present invention, is disclosed. The container adapter 46 is removably attached to the second chamber adapter 45 and provides a female receiver for a variety of plastic containers 80. The container adapter 46 comprises a stepped female design with graduated diameters to provide a radially supported seal to container mouths 80 having different diameters. The container adapter 46 is envisioned to be made using a pliable and sealable material such as silicone rubber, urethane rubber, or the like. The container adapter 46 is also envisioned to be provided in different sizes for different container 80 diameter ranges, thereby expanding the capabilities of the apparatus 10.

Figure 5:
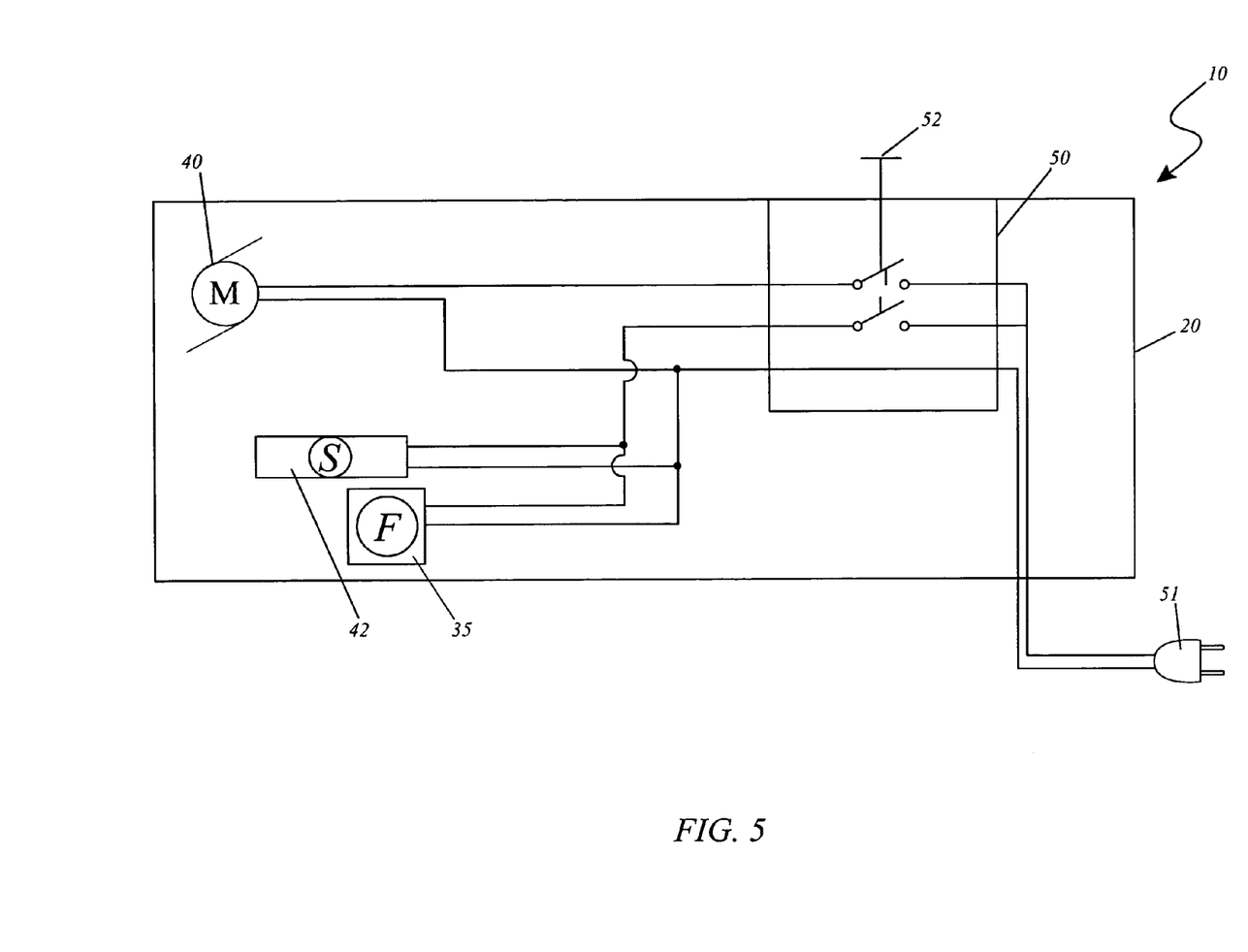

Referring finally now to FIG. 5, a schematic block diagram of the apparatus 10, according to the preferred embodiment of the present invention, is disclosed. Electrical power is provided to the apparatus 10 by utilizing available 110-volt alternating current (AC) via a common cord and plug 51. All active electrical equipment resides within the enclosure 20. Activation of several components of the present invention 10 occur coincidentally including the vacuum pump 40, the solenoid valve 42, and the cooling fan 35 upon actuating a double pole-single throw switch 52. The circuit remains active until the switch is turned off.

It is envisioned that other styles and configurations of the present invention can be easily incorporated into the teachings of the present invention, and only one particular configuration shall be shown and described for purposes of clarity and disclosure and not by way of limitation of scope. The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: selecting a preferred wall surface on which to mount the apparatus 10 in the home or shop, the apparatus 10 having been received in a pre-assembled state including the vacuum pump 40, the vacuum chamber 60 and all associated electrical and plumbing components; removing the vacuum chamber 60 temporarily by disassembling the first chamber adapter 48 and second chamber adapter 45, and removing the vacuum chamber 60; mounting the apparatus 10 to the wall surface using the mounting holes 29 and provided fasteners; re-installing the vacuum chamber 60 by reversing the aforementioned steps; connecting the power cord 51 to an available 110 volt AC outlet; closing and verifying that the door latch 32 is connected securely to the door catch 33, thereby sealing the gasket 62 to the door panel 25 and eliminating possible vacuum leaks; placing the mouth of the container 80 to be evacuated upward and centered within the container adapter 46, thereby forming a snug seal; moving the on/off switch 52 to the "ON" position, thereby providing electrical current to the vacuum pump 40, beginning the evacuation cycle of the plastic container 80, reducing the container 80 volume, and enabling said container 80 to completely collapse; moving the on/off switch 52 to the "OFF" position, thereby turning off the vacuum pump 40, activating the vent valve 42, and returning the vacuum system to atmospheric pressure; removing and disposing of the plastic container 80; opening the door 25 and cleaning any residual liquid 81 or entrained solids contained within the vacuum chamber 60; thoroughly cleaning the vacuum chamber 60 on a periodic basis by opening the door 25, disassembling the first and second chamber adapters 48, 45, removing the vacuum chamber 60 for cleaning, and re-installing the vacuum chamber 60; and, contributing to the environment by reducing the space required to dispose of plastic containers 80.

An alternative embodiment of the present invention 10 comprises an air freshener system being incorporated into the louvers 30, 31, thereby reducing the emission of foul odors from the plastic containers 80.

Another alternative embodiment of the present invention 10 provides an internal timer being associated with the on/off switch 52, thereby allowing the vacuum pump 40 to stop and the collapsed plastic container to drop into a trash bin in an automatic manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An apparatus for crushing or otherwise evacuating a container, comprising:
   a framed enclosure, further comprising:
     a first side panel;
     a second side panel;
     a first louver located on an upper half of said first side panel, comprising a plurality of aluminum slide-in-type louvered panels;
     a second louver located on an upper half of said second side panel, comprising a plurality of aluminum slide-in-type louvered panels,
     a top panel connected to the top ends of both side panels;
     a bottom panel connected to an intermediary location of both side panels;
     a rear panel downwardly extending from said top panel and connected to both said side panels and having a plurality of mounting holes;
     a pump mounting panel affixed thereto both side panels in an intermediary location between said top and bottom panels and providing a horizontal shelf wherein said vacuum pump is mounted thereto; and
     a door panel hingedly connected to said first side panel;
   a vacuum pump mounted within said framed enclosure;
   a solenoid vent valve and vacuum plumbing connected to an inlet of said vacuum pump;
   a vacuum chamber within said framed enclosure connected to said vacuum plumbing;
   a container adapter for removably connecting said vacuum chamber to said container; and
   an electrical system supplying power thereto said vacuum pump and vent valve to commence an evacuation process;
   wherein said framed enclosure provides a housing for various containers and evacuation equipment in an aesthetic and sound-reducing manner;
   wherein said first and second louvers provide a cooling and ventilation means to remove heat generated when said vacuum pump is active.

2. The apparatus of claim 1, wherein said door panel further comprises a doorknob located on an exterior wall and a chamber support feature attached to an interior wall which provides a male feature which is inserted into a front opening of said vacuum chamber upon closing said door panel, thereby providing structural support to said vacuum chamber as vacuum forces are applied during said evacuation process.

3. The apparatus of claim 2, wherein said door panel comprises a door louver located on an upper half of said door panel and comprises a plurality of aluminum slide-in-type louvered panels, thereby providing a cooling and ventilation means to remove heat generated when said vacuum pump is active.

4. The apparatus of claim 3, further comprising a door securing mechanism comprising a door latch located on said interior wall of said door panel and a door catch located on a front wall of said pump mounting panel.

5. The apparatus of claim 4, wherein said vacuum chamber comprises a rigid cubic structure with an open end capable of withstanding the forces of an internal high vacuum, thereby providing a temporary collection and containment means for any entrained liquids or solids emitting from said containers during said evacuation process, further comprising:
   a first chamber adapter fabricated out of corrosion-resistant materials comprising a first plumbing fitting means between said vacuum plumbing and an upper orifice of said vacuum chamber and a first sealing means;
   a second chamber adapter fabricated out of corrosion-resistant materials and comprising: a second plumbing fitting means between a lower orifice of said vacuum chamber and said container adapter and a second sealing means;
   a lip, wherein said lip provides a liquid containment means for said vacuum chamber and located along a front lower edge of said vacuum chamber with a height of a range of one-half (½") to one inch (1"); and,
   a gasket on an outer periphery of said open end for engaging said chamber support feature of said door panel for providing a vacuum sealing means between said vacuum chamber and said door panel.

6. The apparatus of claim 5, wherein said vacuum plumbing further comprises: a solenoid vent valve, providing a backfilling means to said vacuum plumbing and said vacuum chamber at a conclusion of said evacuation process; vacuum tubing; plumbing fittings; and mounting brackets for mounting said vacuum plumbing thereto said interior of framed enclosure.

7. The apparatus of claim 6, wherein said container adapter comprises a removably attachable device removably mounted thereto said second chamber adapter at an upper extremity and provides an attachment means to a variety of containers at a lower extremity, said lower extremity comprises a stepped female design with graduated diameters to provide a radially supported seal to a plurality of container mouths having different diameters.

8. The apparatus of claim 7, wherein said electrical system further comprises an electrical box mounted on an interior wall of said first side panel for receiving current from a power cord and supplying power to said vent valve and said vacuum pump, said power is controlled by an on/off switch in electrical communication with said electrical box, mounted on an exterior wall of said first side panel, which provides a control means to initiate said evacuation process.

9. A method for crushing a container utilizing a vacuum pump to provide an evacuation process and provided therein a framed enclosure, comprising the steps of:
   providing a framed enclosure, further comprising:
     a first side panel, a second side panel, a top panel connected to the top ends of both side panels, a bottom panel connected to an intermediary location of both side panels, a rear panel downwardly extending from said top panel and connected to both said side panels and having a plurality of mounting holes, and, a pump mounting panel affixed thereto both side panels in an intermediary location between said top and bottom panels and providing a horizontal shelf wherein said vacuum pump is mounted thereto, wherein said framed enclosure provides a housing for various containers and evacuation equipment in an aesthetic and sound-reducing manner;
   a door panel hingedly connected to said first side panel further comprising a doorknob located on an exterior wall and a chamber support feature attached to an interior wall which provides a male feature which is inserted into a front opening of said vacuum chamber upon closing said door panel, thereby providing structural support to said vacuum chamber as vacuum forces are applied during said evacuation process;
   a door securing mechanism comprising a door latch located on said interior wall of said door panel and a door catch located on a front wall of said pump mounting panel; and, a first louver and second louver located on an upper half of each said first and second side panel, respectively, and a door panel louver located on an upper half of said door panel;

providing a vacuum pump mounted within said framed enclosure, comprising a commercially available diaphragm-type pump common in the industry, further comprising: a rated flow capacity within a range of three (3) and six (6) cubic feet per minute; a peak vacuum level of at least twenty-six (26) inches of mercury (1.27 PSI); and, a cartridge filter which provides a protection means to said vacuum pump against entrained airborne particles;

providing a vacuum chamber within said framed enclosure connected to said vacuum plumbing, comprising a rigid cubic structure with an open end capable of withstanding the forces of an internal high vacuum, thereby providing a temporary collection and containment means for any entrained liquids or solids emitting from said containers during said evacuation process and further comprising a first chamber adapter, a second chamber adapter, a lip for retaining collected entrained solids and liquids, and a gasket for sealing said door panel to said vacuum chamber;

providing vacuum plumbing, further comprising a solenoid vent valve, vacuum tubing, plumbing fittings, and mounting brackets;

providing a container adapter for removably connecting said vacuum chamber to said container;

providing an electrical system supplying power thereto said vacuum pump and vent valve, comprising an electrical box for transferring power to said vacuum pump and said vent valve, and an on/off switch in electrical communication with said box for controlling power to said box;

selecting a preferred vertical wall surface on which to mount said apparatus, said apparatus having been received in a pre-assembled state wherein said vacuum pump, said vacuum chamber, electrical wiring, and said vacuum plumbing components are installed therein said framed enclosure;

removing said vacuum chamber temporarily by disassembling said first chamber adapter and said second chamber adapter;

mounting said apparatus to said vertical wall surface using said mounting holes and provided fasteners;

re-installing said vacuum chamber;

connecting said power cord to an available 110 volt AC outlet; closing said door panel and verifying that said door latch is connected securely to said door catch, thereby sealing said gasket thereto said door panel and eliminating any possible vacuum leaks;

placing a mouth of said container to be evacuated upward and centered within said container adapter, thereby forming a snug seal;

moving said on/off switch to an "ON" position, thereby providing electrical current to said electrical box and thereto said vacuum pump and vent valve and beginning said evacuation process;

evacuating a volume of said container at a evacuation rate and enabling said container to completely collapse;

moving said on/off switch to an "OFF" position, thereby discontinuing operation of said vacuum pump;

activating said vent valve, thereby returning said vacuum plumbing and vacuum chamber to atmospheric pressure; removing and disposing of said container;

opening said door panel and cleaning any residual liquid or entrained solids contained within said vacuum chamber; and, contributing to an environmental maintenance program by reducing a space required to dispose of said containers.

10. An apparatus for crushing or otherwise evacuating a container, comprising:

a framed enclosure, further comprising:

a first side panel, a second side panel, a top panel connected to the top ends of both side panels, a bottom panel connected to an intermediary location of both side panels, a rear panel downwardly extending from said top panel and connected to both said side panels and having a plurality of mounting holes, and, a pump mounting panel affixed thereto both side panels in an intermediary location between said top and bottom panels and providing a horizontal shelf wherein said vacuum pump is mounted thereto, wherein said framed enclosure provides a housing for various containers and evacuation equipment in an aesthetic and sound-reducing manner;

a door panel hingedly connected to said first side panel further comprising a doorknob located on an exterior wall and a chamber support feature attached to an interior wall which provides a male feature which is inserted into a front opening of said vacuum chamber upon closing said door panel, thereby providing structural support to said vacuum chamber as vacuum forces are applied during said evacuation process;

a door securing mechanism comprising a door latch located on said interior wall of said door panel and a door catch located on a front wall of said pump mounting panel; and, a first louver and second louver located on an upper half of each said first and second side panel, respectively, and a door panel louver located on an upper half of said door panel;

a vacuum pump mounted within said framed enclosure, comprising a commercially available diaphragm-type pump common in the industry, further comprising: a rated flow capacity within a range of three (3) and six (6) cubic feet per minute; a peak vacuum level of at least twenty-six (26) inches of mercury (1.27 PSI); and, a cartridge filter which provides a protection means to said vacuum pump against entrained airborne particles;

a vacuum chamber within said framed enclosure connected to said vacuum plumbing, comprising a rigid cubic structure with an open end capable of withstanding the forces of an internal high vacuum, thereby providing a temporary collection and containment means for any entrained liquids or solids emitting from said containers during said evacuation process and further comprising a first chamber adapter, a second chamber adapter, a lip for retaining collected entrained solids and liquids, and a gasket for sealing said door panel to said vacuum chamber;

vacuum plumbing, further comprising a solenoid vent valve, vacuum tubing, plumbing fittings, and mounting brackets;

a container adapter for removably connecting said vacuum chamber to said container; and, an electrical system supplying power thereto said vacuum pump and vent valve, comprising an electrical box for transferring power to said vacuum pump and said vent valve, and an on/off switch in electrical communication with said box for controlling power to said box.

11. The method of claim 9, wherein said evacuation rate ranges between one (1) and two (2) minutes.

12. The apparatus of claim 1, wherein said vacuum pump comprises a commercially available diaphragm-type pump common in the industry, further comprising: a rated flow capacity within a range of three (3) and six (6) cubic feet per minute; a peak vacuum level of at least twenty-six (26) inches of mercury (1.27 PSI); and, a cartridge filter which provides a protection means to said vacuum pump against entrained airborne particles.

13. The apparatus of claim 3, further comprising a plurality of air fresheners system incorporated thereinto said first, second, and door louvers, thereby reducing an emission of foul odors from said evacuation process due to entrained liquids or solids from said containers.

14. The apparatus of claim 4, wherein said framed enclosure comprises a thickness in the range of one-quarter (¼") to three-quarters (¾") inches thick and is fabricated out of one or more materials from the following list: wood, plastic, fiberglass, aluminum, or composite material.

15. The apparatus of claim 5, wherein said first and second sealing means further comprises sealing washers and a nut, preferably fabricated out of nylon or polytetrafluoroethylene, thereby providing an airtight seal for said vacuum chamber to said vacuum plumbing and said container adapter.

16. The apparatus of claim 5, wherein said gasket comprising one of the following list: a thin silicone rubber gasket applied as an adhesive layer, or an extruded plastic gasket mechanically supported by said open end of said vacuum chamber.

17. The apparatus of claim 7, wherein said container adapter comprises a pliable and sealable material of the following list: silicone rubber or urethane rubber, and provided in a plurality of different sizes for different container mouth diameters.

18. The apparatus of claim 8, further comprising an internal timer in electrical communication with said on/off switch, thereby allowing said vacuum pump to stop and discontinue said evacuation process and said container to drop into a receptacle for further processing.

* * * * *